United States Patent [19]

Updike

[11] Patent Number: 5,784,738
[45] Date of Patent: Jul. 28, 1998

[54] HINGE MODIFIED TO HAVE TORQUE LIMITING FASTENER

[76] Inventor: Gregory J. Updike, 463 Vester, Ferndale, Mich. 48220-1955

[21] Appl. No.: 649,855

[22] Filed: May 6, 1996

[51] Int. Cl.$^6$ ............................ E01D 15/12; F16B 31/00
[52] U.S. Cl. .................... 14/2.4; 14/77.1; 411/5; 411/389; 411/410
[58] Field of Search .................... 14/2.4, 5, 13, 14, 14/73.1, 77.1, 78; 411/2, 3, 5, 389, 537, 405, 410; D08/387

[56] References Cited

U.S. PATENT DOCUMENTS

| | | | |
|---|---|---|---|
| 1,473,033 | 11/1923 | Gerzen | 411/405 |
| 1,677,269 | 7/1928 | Burghart | 411/5 |
| 2,647,270 | 8/1953 | Frost | 14/13 |
| 3,174,383 | 3/1965 | Heil | 411/405 |
| 3,343,443 | 9/1967 | Moore | 411/5 |
| 3,444,775 | 5/1969 | Hills | 411/3 X |
| 3,498,174 | 3/1970 | Schuster et al. | 411/5 |
| 4,109,691 | 8/1978 | Wilson | 411/3 |
| 4,860,513 | 8/1989 | Whitman | 411/537 X |
| 5,366,330 | 11/1994 | Cosenza | 411/405 |

FOREIGN PATENT DOCUMENTS

| | | | |
|---|---|---|---|
| 1025766 | 4/1953 | France | 411/405 |
| 2353751 | 5/1975 | Germany | 411/3 |
| 0684821 | 12/1952 | United Kingdom | 411/3 |

Primary Examiner—James Lisehora
Attorney, Agent, or Firm—Peter A. Taucher; David L. Kuhn

[57] ABSTRACT

A hinge connects the webbing of a first bridge span to the webbing of a second bridge span. The hinge has male hinge plates on opposite sides of the first span's webbing and has female hinge plates on opposite sides of the second span's webbing. A shaft passing through the male hinge plates and first span's webbing is threaded on the ends but is smooth between the ends. Pockets at outer surfaces of the male plates surround the threaded ends and accept torque limiting nuts engaging the shaft. The nuts have heads, recess bodies and frangible necks connecting the heads to the bodies. No part of the bodies extends past the outer surfaces of the male plates. When the nuts are driven onto the shafts at a given torque, the necks break and the heads twist off. Then any remaining parts of the necks are removed. The male hinge plate can then be rotatably mounted adjacently between the female hinge plates.

3 Claims, 6 Drawing Sheets

5,784,738

1

HINGE MODIFIED TO HAVE TORQUE LIMITING FASTENER

GOVERNMENT USE

The invention described here may be made, used and licensed by or for the U.S. Government for governmental purposes without paying me royalty.

BACKGROUND

One of the combat support vehicles used by military ground forces is a mobile assault bridge. This vehicle includes a tank chassis, hinged bridge spans mounted on the tank chassis and a powered mechanism to deploy and retract the spans. The bridge spans tend to move relative to one another when vehicles cross the assault bridge, so that hinges connecting the spans are subjected to considerable stresses. Thus these hinges must be strong and they must be securely fastened to the spans.

Fastening the hinges to the bridge spans has certain problems. First, the hinges and spans are made from aircraft grade aluminum whose material qualities are degraded by heat, so that the hinges can not be welded to the spans. Second, if mechanical fasteners are used, they can exert only a limited torque on the hinges and spans so as to avoid damaging them. Finally, the fasteners must be recessed into male hinge elements that rotate past female hinge elements so that the fasteners do not impair hinge operation.

SUMMARY

My modified hinge connects spans of a mobile assault bridge and which addresses the aforementioned problems. The modification is comprised mainly of new fasteners fixing hinge plates to the spans. The plates are new only in that they are modified to accept the new fasteners.

The hinge has male hinge plates on opposed sides of a first bridge span's webbing and has female hinge plates on opposed sides of a second span's webbing. The new fastener includes a shaft through the male hinge plates and through first span's webbing. The shaft is threaded on the ends but is smooth between the ends. Recess pockets in the male plates surround the threaded ends and accept torque limiting nuts that engage the shaft. These nuts have heads, bodies within the pockets and frangible necks connecting the heads to the bodies. When the nuts are driven onto the shafts at a selected torque, the necks break and the heads twist off. Remaining parts of the necks are removed. The male hinge plate is then rotatably mounted adjacently between the female hinge plates.

2

Figure 8:
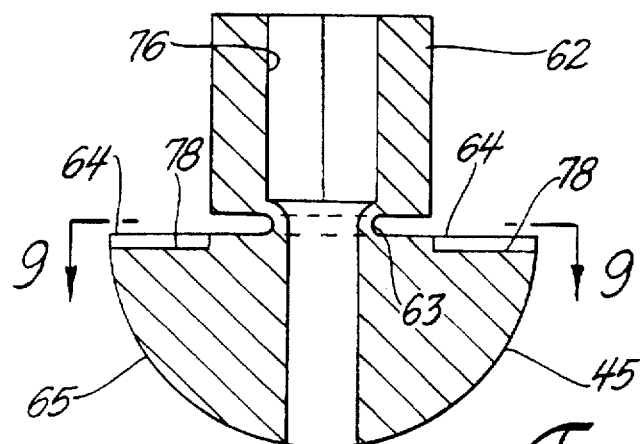

FIG. 8 is a sectional view of an alternate embodiment of the torque limiting nut.

Figure 9:
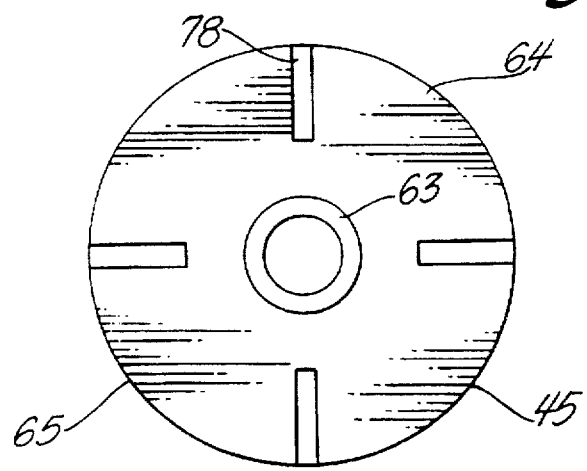

FIG. 9 is a sectional view taken along line 9—9 in FIG. 8.

Figure 10:
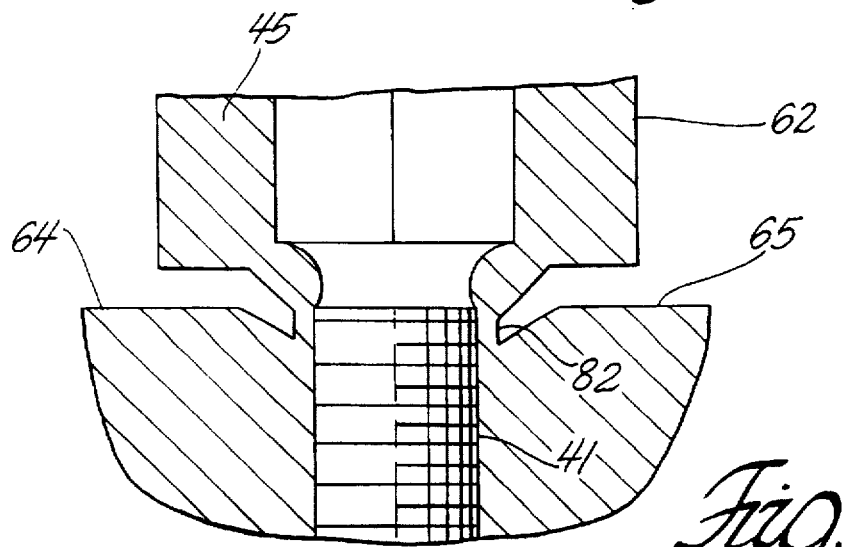

FIG. 10 is a detail sectional view of a modified neck connecting the head of the nut to the body of the nut.

Figure 11:
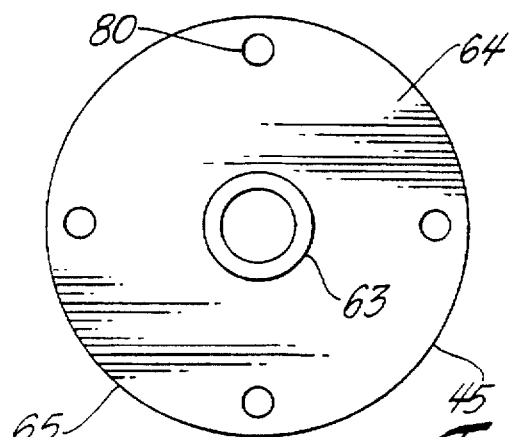

FIG. 11 is a modification of the embodiment of the nut shown in FIGS. 8 and 9.

Figure 12:
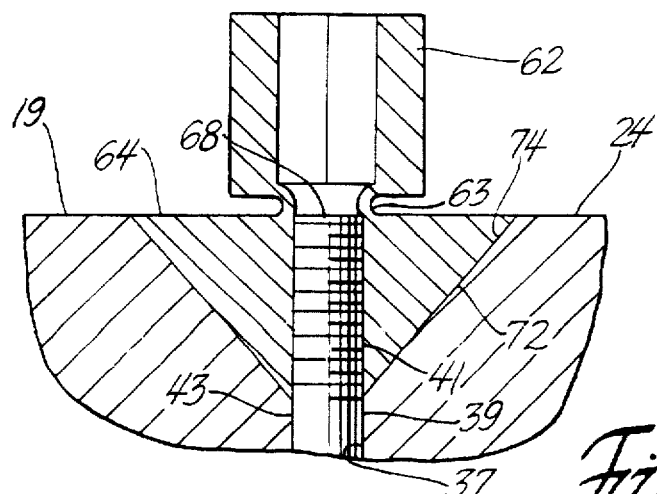

FIG. 12 is a sectional view of another alternate embodiment of the torque limiting nut.

Figure 13:
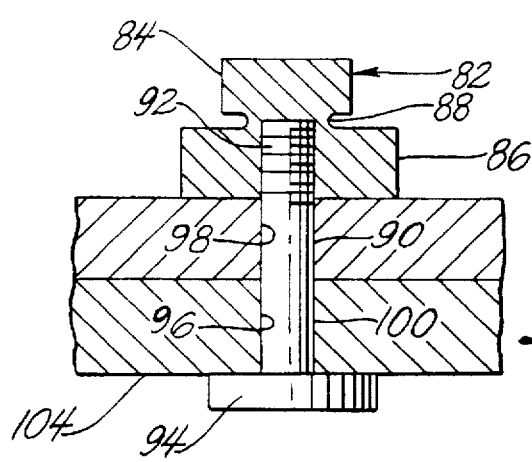

FIG. 13 is a sectioned view of a still further alternate embodiment of the torque limiting nut, the nut engaging a complementary bolt to hold aluminum walls together.

Figure 14:
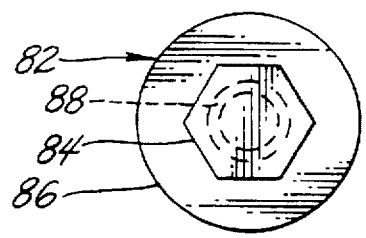

FIG. 14 is a plan view of the torque limiting nut shown in FIG. 13.

DETAILED DESCRIPTION

Figure 1:
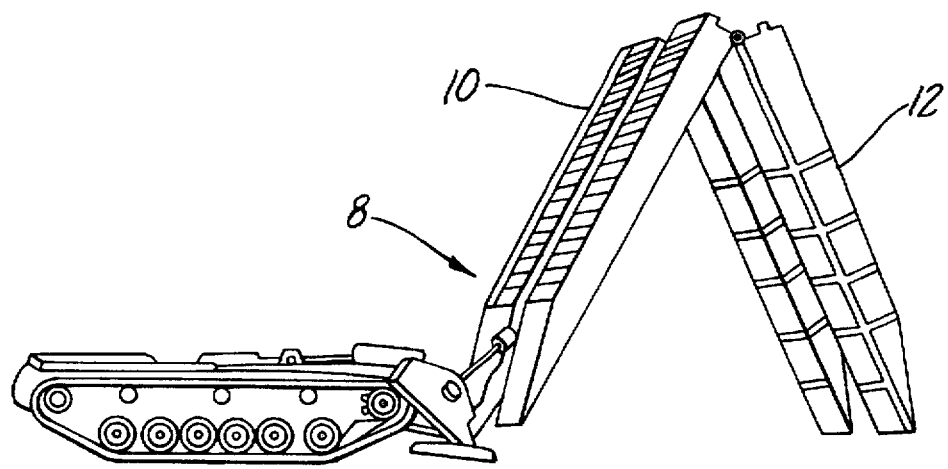
FIG. 1 shows a mobile assault bridge unit.
Figure 3:
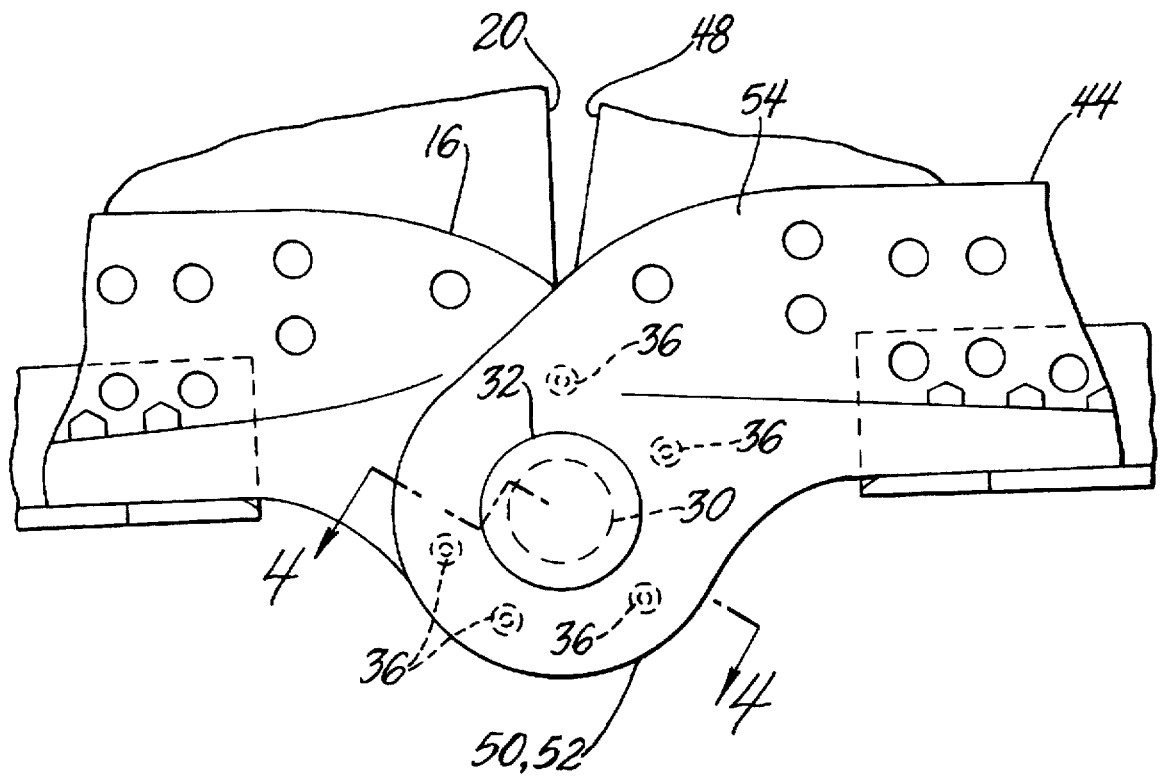
FIG. 3 is a detail view of a hinge connection between the spans.

FIG. 1 shows a mobile assault bridge unit 8 having hinged bridge spans 10 and 12 shown in a partially deployed position. In the fully deployed position, bridge spans 10 and 12 are extended horizontally in front of vehicle 14, and typically the spans reach across a ravine or small river. In the fully retracted position, spans 10 and 12 are folded together and lie atop vehicle 14. Spans 10 and 12 are typically made of aircraft grade aluminum, so they are light enough to deploy but strong enough to support vehicles such as the M1A2Abrams tank.

Figure 2:
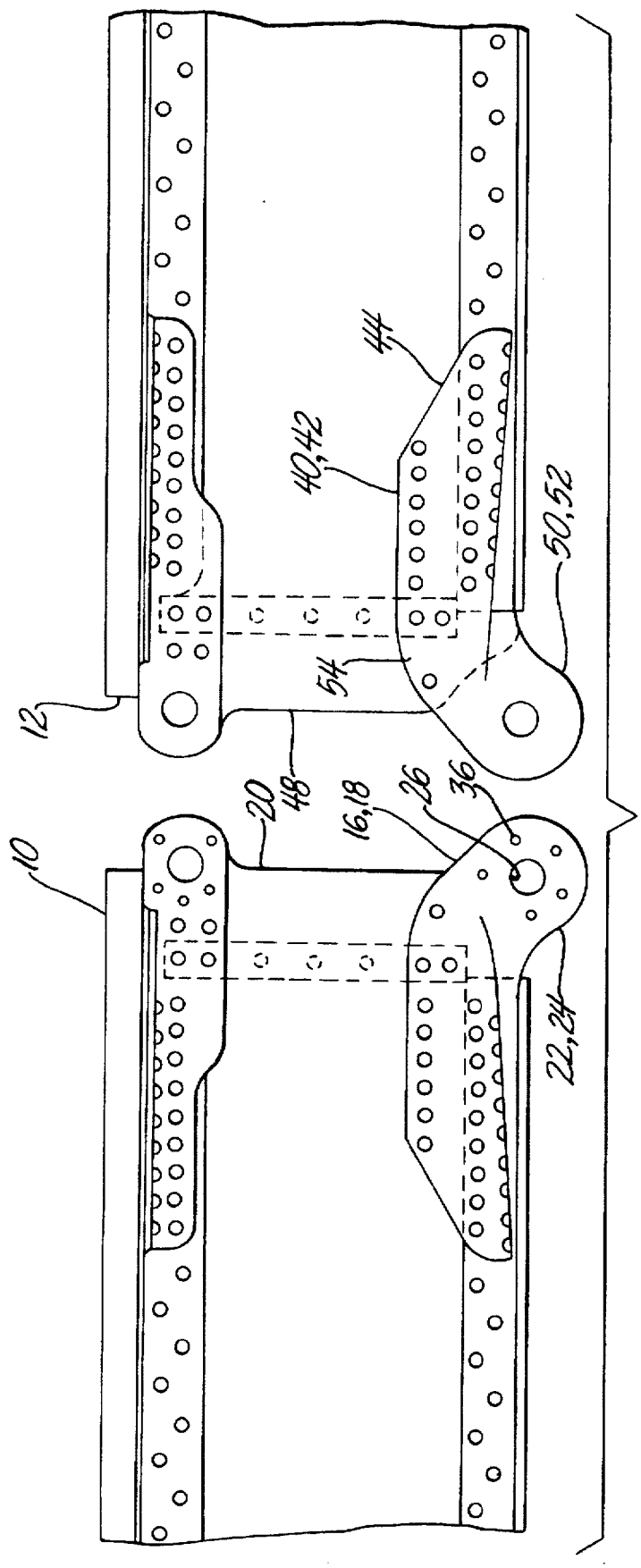
FIG. 2 shows ends of bridge spans of the mobile assault bridge unit.
Figure 4:
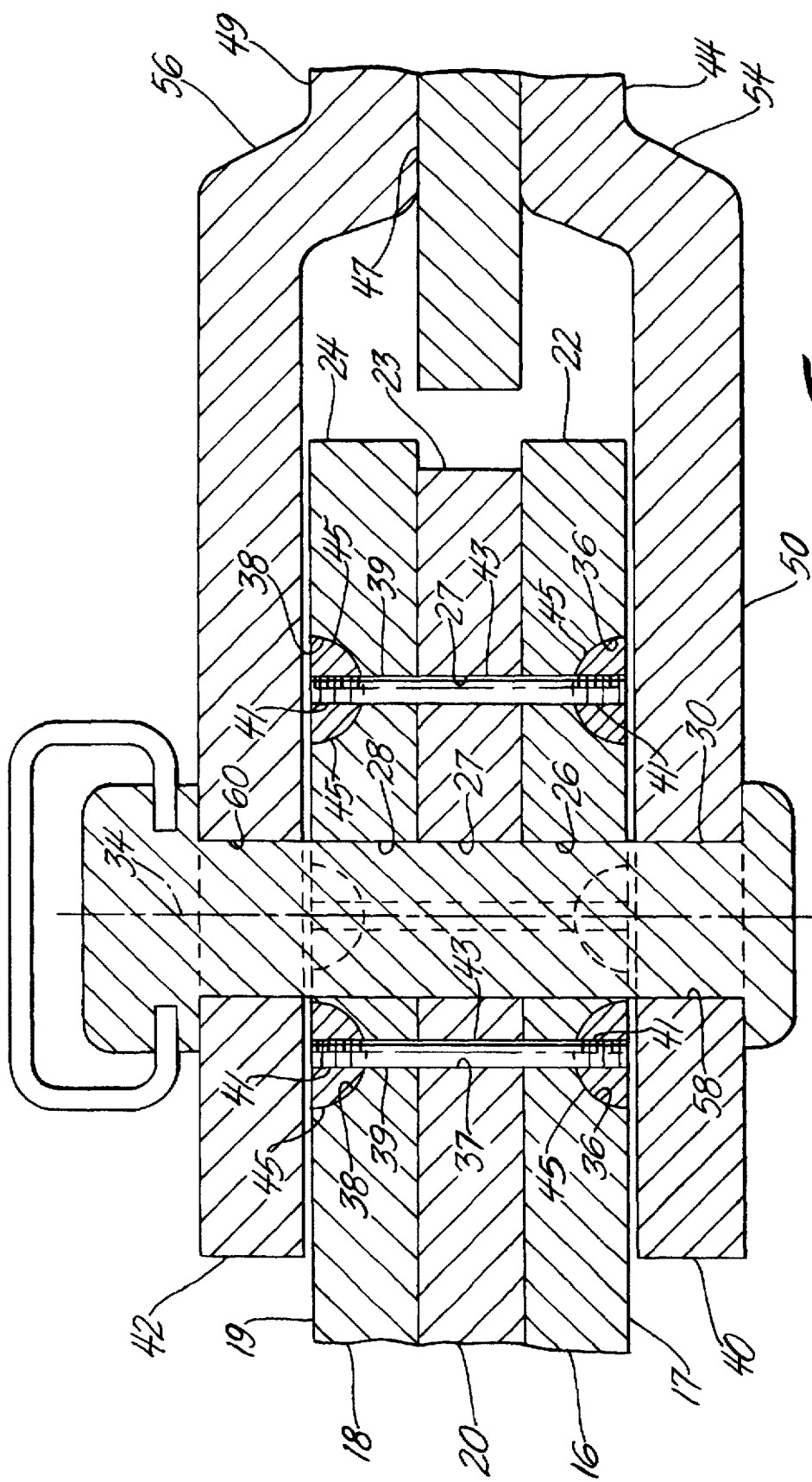
FIG. 4 is a sectional view taken along line 4—4 in FIG. 3.

Referring to FIGS. 2 and 4, bridge span 10 has bolted or riveted thereto a pair of parallel male hinge plates 16 and 18. Male hinge plate 16 is fixed to the outside of web 20 and male hinge plate 18 is fixed to the inside of webbing 20. A rounded, ear-like portion 22 of plate 16 extends vertically and horizontally from span 10 and a similar ear-like portion 24 of plate 18 extends from span 10. Sandwiched facially between the plates' ear-like portions is a projection 23 of webbing 20, the projection having the same shape as the ear-like portions. Portions 22 and 24 define hinge pin holes 26 and 28, and webbing projection 23 defines a hinge pin hole 27. Holes 26, 27 and 28 accommodate shank 30 of hinge pin 32, these holes and the pin being centered on hinge axis 34.

Again referring to FIGS. 2 and 4, bridge span 12 has affixed thereto a pair of parallel female hinge plates 40 and 42, which are complementary to male hinge plates 16 and 18. Female plate 40 has a facial engagement section 44 fixed to the outside of webbing 48 and female plate 42 hinge plate has a similar facial engagement section fixed 49 to the inside of webbing 48, whereby a portion 47 of webbing 48 is sandwiched between the facial engagement sections of female hinge plates 40 and 42. Plate 40 has a rounded, ear-like section 50 extending vertically and horizontally beyond webbing 48 and plate 42 has a similar ear-like section 54 extending beyond webbing 48. Sections 50 and 52 define hinge pin holes 58 and 60 which are centered on axis 34 and which accommodate shank 30 of hinge pin 32.

Unlike the male plates' ear-like portions 22 and 24, the female plates' ear-like sections 50 and 52 are spaced from webbing 48. The female plates have mediate sections 54 and 56 which connect their facial engagement sections to their ear-like sections. The ear-like portions 40 and 42 of male plates 16 and 18 thus fit between the ear like sections 50 and 52 as seen in FIG. 4. There is a slight axial gap—i.e., a distance parallel to axis 34-between adjacent male and female hinge plates. The axial gap should be made as small as possible without causing the plates to rub. So reducing the gap width lessens damage to ear-like sections 50 and 52, and lessens damage to portions 22 and 24 caused by vehicles rolling on bridge spans 10 and 12.

About hinge pin hole 26 are a plurality of apertures 36 for receiving threaded fasteners, and like apertures 38 are about hinge pin hole 28. Webbing projection 27 has complementary apertures 37 that align with apertures 36 and 38 in the ear-like plate portions. In the apertures are shafts 39 having threaded ends 41 and smooth mediate zones 43 between the threaded ends. Normally, the threaded ends are entirely within pockets 70 (FIG. 5) that form part of apertures 36 and 38. Recessed nuts 45 engage the ends 41. No part of nuts 45 or ends 41 extend beyond the outer surfaces 17 and 19 of ear-like portions 22 and 24. These outer surfaces face toward, and define the slight axial gap with, the ear-like sections of the female hinge plates.

Figure 5:
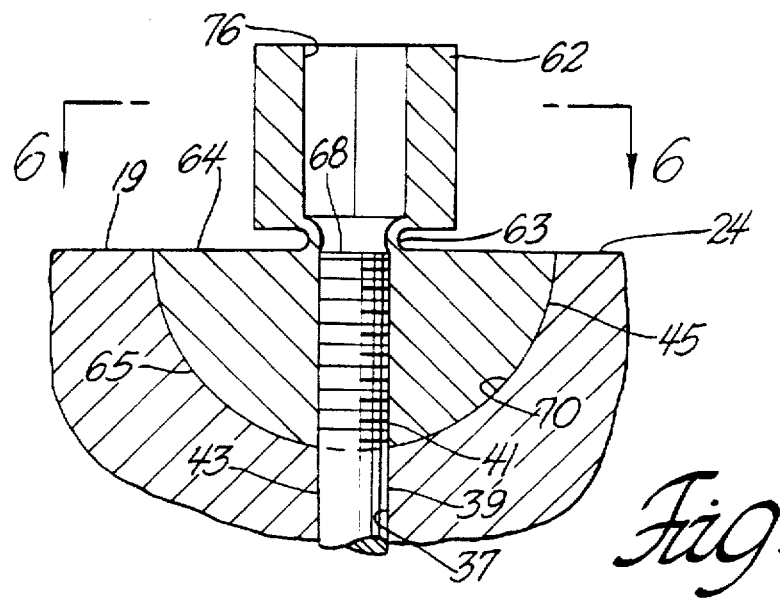
FIG. 5 is a sectional view of a torque limiting nut engaged to a male hinge plate.
Figure 6:
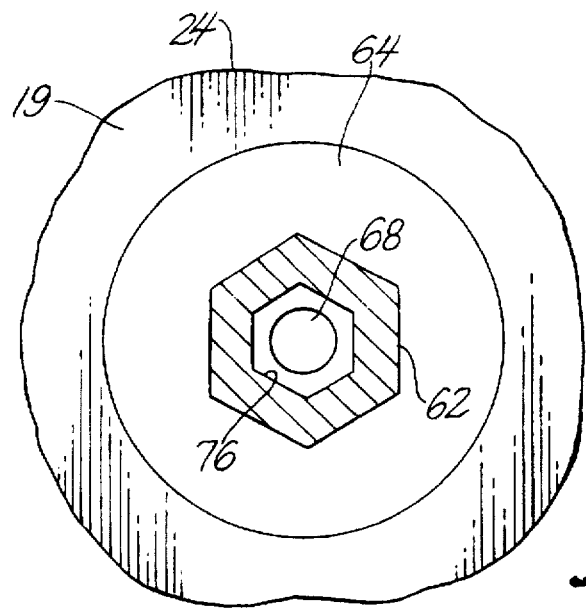
FIG. 6 is a sectional view taken along line 6—6 in FIG. 5.

In FIG. 5 is a detail sectional view of a recessed nut 45 before the nut's twist-off head 62 has been removed. A frangible annular neck 63 connects head 62 to hemispherical recessed body 65 and body 65 conforms to a smooth round pocket 70 defined by portion 24. Optionally, the recessed body may have a generally conical shape shown at 72 in FIG. 12, body 72 conforming to tapered countersink 74. As seen in FIG. 6, head 62 defines a cross-sectionally hexagonal cavity 76 that accommodates an allen wrench or similar tool. The exterior of head 62 also has a hexagonal shape, so that nut 64 can be turned by other conventional wrenches.

Ear-like portions 22 and 24, ear-like sections 40 and 42, and webbing 20 are all made of aircraft grade aluminum, which is softer than shaft 39 and nut 45, which are made of steel. Consequently, it is desired to limit the torque by which the nuts are driven onto shafts 39 so as to prevent damage to and weakening of the ear-like portions, ear-like sections and webbing. Hollow neck 63 is a means of limiting such torque, since neck 63 is the weakest part of nut 45 and breaks at a selected torque.

Figure 7:
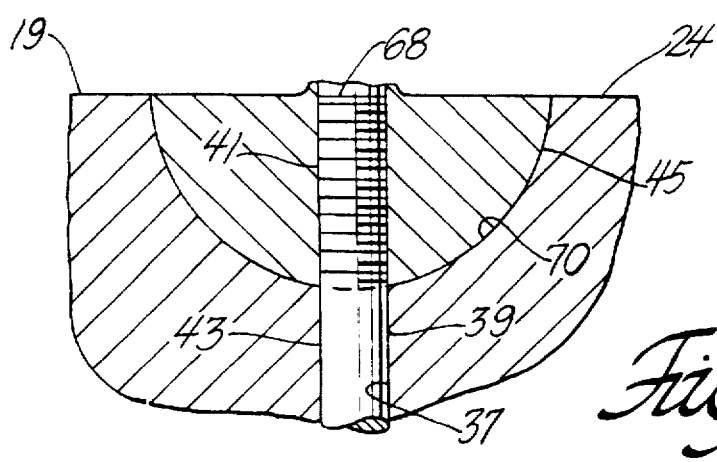
FIG. 7 is another sectional view of the torque limiting nut engaged to the male hinge plate, where the head of the nut has been twisted off.

Returning to FIG. 5, the outer exposed surface 64 of the nut and end surface 68 of shaft 39 are flush with outer surface 66 of ear-like portion 24. Thus, when head 62 is twisted off body 65 (FIG. 7) and the remainder of neck 63 has been ground off, no part of nut 45 or shaft 39 will extend out further from portion 24 than outer surface 19 thereof. Consequently, nut 45 does not cause a need for widening the aforementioned axial gap between the male and female hinge plates. Surface 64 is flat and is featureless in that it has no projections or cavities. Hence, once neck 63 is ground off, nut 45 can not be gripped and thus can not be tightened further or loosened.

In FIGS. 8 and 9, nut 45 is shown alone and is modified to have a pattern of slots 78 at surface 64. These slots will enable nut 45 to be removed from shaft 39 by a special tool available at U.S. Army maintenance depots but not elsewhere. Consequently, the slots do not enable relatively unskilled field personnel to over torque nut 45 but do permit depot personnel to easily remove nut 45. In FIG. 11, a view similar to FIG. 9, holes 80 replace slots 78 and serve the same purpose as the slots.

In FIG. 10, neck 63 of nut 45 has been replaced by neck 82, whose narrowest, weakest portion is recessed relative to outer exposed surface 64. Neck 82 is typically capable of accepting the tip portion of threaded end 41 therein. When head 62 is twisted off, neck 82 breaks at a location more inward relative to plate 23 (FIG. 5) than surface 64. Thus there will be no need to grind off the broken remainder of neck 82 after head 62 is removed.

FIG. 13 shows an alternate embodiment 82 of my torque limiting nut having a polygonal nut head 84 and a round internally threaded nut body 86. Nut head 84 is attached to body 86 by hollow annular neck 88 similar to neck 63 in FIGS. 5 through 12. A bolt 90 has an end 92 that threads with the inner diameter of body 86. Between end 92 and round bolt head 94 is a smooth round shank 96 that passes through respective holes 98 and 100 in walls 102 and 104. Walls 102 and 104 are typically aircraft grade aluminum webs of bridge spans or other span components such as hinge plates. Nut 82 is driven onto bolt 90 until head 94 twists off at a chosen torque. Since nut body 86 and bolt head 94 are both round, the nut and bolt can not easily be removed.

I wish it to be understood that I do not desire to be limited to the exact details of construction or method shown herein since obvious modifications will occur to those skilled in the relevant arts without departing from the spirit and scope of the following claims.

What is claimed is:

1. A method of making a hinge connection between a first webbing and a second webbing, comprising:

placing male hinge plates on opposite sides of the first webbing;

fixing female hinge plates on opposite sides of the second webbing;

providing pockets at outer surfaces of the male hinge plates fabricating a shaft harder than the male plates;

threading the shaft at both ends;

passing the shaft through the male hinge plates and first webbing;

providing nuts harder than the male plates, the nuts having twist-off heads and recess bodies connected to the heads;

threading the nuts onto the threaded ends until the recess bodies conform to the pockets and until no part of the bodies extend beyond the outer surfaces of the male plates, such that no parts of the ends extend beyond planes in which lie the outer surfaces;

preventing the nuts from damaging the male plates by means of torque control necks connecting the heads to the recess bodies;

twisting the heads off the nuts while tightening the nuts in engagement with the male plates, the necks breaking at a torque no greater than a chosen maximum;

after twisting off the heads, removing any portions of the necks extending beyond the outer surfaces of the male plates;

placing the male hinge plates adjacently between the female hinge plates such that axial gaps between outer surfaces of the male plates and the female plates are minimized;

placing a hinge pin along a common hinge axis of the male plates and female plates.

2. The method of claim 1 further comprised of providing the recess bodies with a featureless exposed surface faced outward from the outer surface of the male plates.

3. The method of claim 1 wherein the step of twisting the heads off the nuts includes breaking the necks at locations recessed relative to the outer surfaces of the male plates.

\* \* \* \* \*